United States Patent
Saito et al.

(10) Patent No.: US 12,418,548 B2
(45) Date of Patent: Sep. 16, 2025

(54) ILLEGAL SIGNAL DETECTION APPARATUS, VEHICLE, AND ILLEGAL SIGNAL DETECTION METHOD

(71) Applicant: HONDA MOTOR CO., LTD., Tokyo (JP)

(72) Inventors: Daisuke Saito, Tokyo (JP); Yuki Hirono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 18/305,390

(22) Filed: Apr. 24, 2023

(65) Prior Publication Data

US 2024/0007485 A1    Jan. 4, 2024

(30) Foreign Application Priority Data

Jun. 30, 2022   (JP) .................................. 2022-106469

(51) Int. Cl.
*H04L 9/40* (2022.01)
*H04L 67/12* (2022.01)

(52) U.S. Cl.
CPC .......... *H04L 63/1416* (2013.01); *H04L 67/12* (2013.01)

(58) Field of Classification Search
CPC ... H04L 63/1416; H04L 67/12; H04W 12/121
See application file for complete search history.

(56) References Cited

U.S. PATENT DOCUMENTS

| 10,798,114 B2 | 10/2020 | Galula |
| 11,709,274 B2 * | 7/2023 | Gum ..................... G01S 19/215 |
| | | 342/357.59 |
| 2016/0134503 A1 * | 5/2016 | Watson ................. H04L 43/026 |
| | | 709/224 |
| 2016/0233302 A1 * | 8/2016 | Wu ..................... H01L 21/8234 |

(Continued)

FOREIGN PATENT DOCUMENTS

| JP | 2017073834 A | 4/2017 |
| JP | 2018117242 A | 7/2018 |

(Continued)

OTHER PUBLICATIONS

Muter et al, A Structured Approach to Anomaly Detection In-Vehicle Networks, 2010 (Year: 2010).*

(Continued)

*Primary Examiner* — Javier O Guzman (57) ABSTRACT

An illegal signal detection apparatus for detecting input of an illegal signal to a communication network for which a signal is expected to be input at a predetermined cycle, the illegal signal detection apparatus including: a measuring unit for measuring, in time series, a time interval among a plurality of continuous signals input to the communication network; and a determination unit for judging, if a time interval between a first signal and a second signal that should be transmitted at the cycle is longer than the cycle, and a signal interval between the second signal and a signal that is input immediately before is equal to or smaller than a predetermined interval, that a competition has occurred when transmitting the second signal to determine that the second signal is an arbitrated normal signal.

18 Claims, 6 Drawing Sheets

(56) References Cited

U.S. PATENT DOCUMENTS

| | | | |
|---|---|---|---|
| 2017/0126703 A1 | 5/2017 | Ujiie | |
| 2017/0180370 A1* | 6/2017 | Satoh | G06F 21/565 |
| 2019/0351844 A1 | 11/2019 | Inoue | |
| 2020/0021611 A1 | 1/2020 | Maeda | |
| 2021/0058372 A1* | 2/2021 | Katoh | B60W 50/04 |
| 2021/0232463 A1* | 7/2021 | Kulkarni | H04L 12/40 |
| 2021/0273956 A1 | 9/2021 | Nishimoto | |
| 2021/0320932 A1* | 10/2021 | Tsurumi | H04L 63/20 |
| 2021/0400024 A1* | 12/2021 | Kulkarni | G06F 16/22 |
| 2022/0032966 A1* | 2/2022 | Senda | B60W 50/023 |
| 2022/0264303 A1 | 8/2022 | Hamada | |
| 2023/0019817 A1* | 1/2023 | Huang | H04L 67/12 |
| 2023/0037318 A1* | 2/2023 | Foster | G05D 1/0027 |

FOREIGN PATENT DOCUMENTS

| | | |
|---|---|---|
| JP | 2018156450 A | 10/2018 |
| JP | 2021064921 A | 4/2021 |
| JP | 2021136631 A | 9/2021 |
| WO | 2019187350 A1 | 10/2019 |
| WO | 2021065068 A1 | 4/2021 |

OTHER PUBLICATIONS

Office Action issued for related Japanese Application No. 2022-107261, transmitted from the Japanese Patent Office on Apr. 9, 2024 (drafted on Apr. 1, 2024).

Office Action issued for related U.S. Appl. No. 18/341,771, issued by the US Patent and Trademark Office on Feb. 3, 2025.

Office Action issued for counterpart Japanese Application No. 2022-106469, transmitted from the Japanese Patent Office on Jul. 29, 2025 (drafted on Jul. 23, 2025).

* cited by examiner

ILLEGAL SIGNAL DETECTION APPARATUS, VEHICLE, AND ILLEGAL SIGNAL DETECTION METHOD

The contents of the following Japanese patent application(s) are incorporated herein by reference:

NO. 2022-106469 filed on Jun. 30, 2022.

TECHNICAL FIELD

The present invention relates to an illegal signal detection apparatus, a vehicle, and an illegal signal detection method.

BACKGROUND

Patent Document 1 and Patent Document 2 disclose techniques of detecting an illegal signal that is input to a communication network.

PRIOR ART DOCUMENT

Patent Document 1: Japanese Patent Application Publication No. 2021-136631
Patent Document 2: Japanese Patent Application Publication No. 2021-064921

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential for a solving means of the invention.

Figure 1:
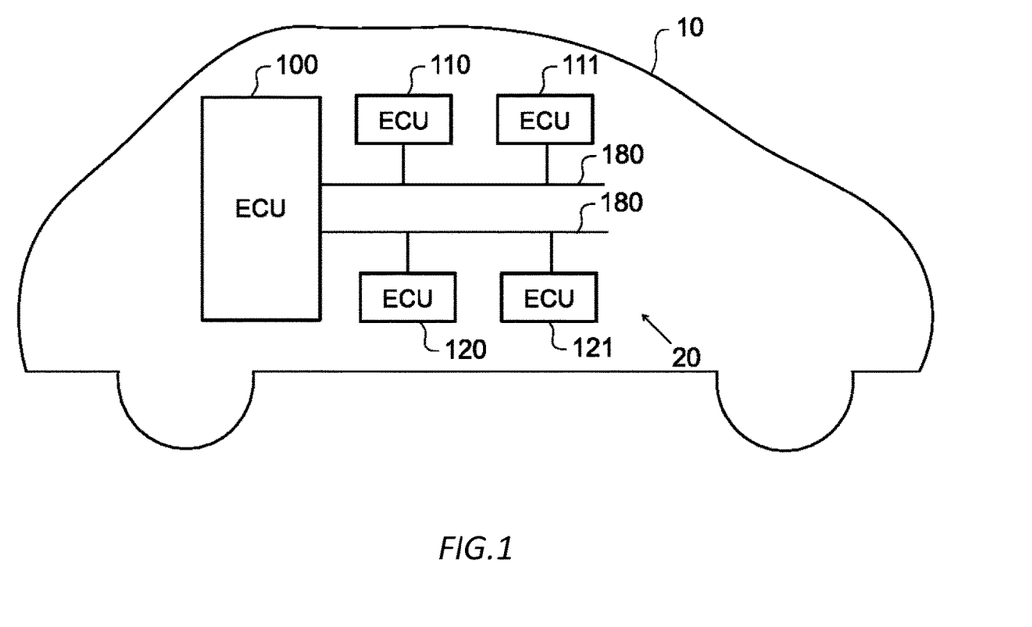
FIG. 1 conceptually illustrates a system configuration of a vehicle 10 in an embodiment.

FIG. 1 conceptually illustrates a system configuration of a vehicle 10 in an embodiment. The vehicle 10 includes a system 20. The system 20 includes a plurality of ECUs (electronic control units) including an ECU 100, an ECU 110, an ECU 111, an ECU 120, and an ECU 121. The ECUs included in the vehicle 10 include an ECU configured to control equipment which directly affects travelling of the vehicle 10, such as, for example, an engine, a gearbox, or a steering gear. The ECUs included in the vehicle 10 include an ECU configured to control equipment which does not directly affect travelling of the vehicle 10, such as, for example, an air conditioner or a navigation device. The ECU 100, the ECU 110, the ECU 111, the ECU 120, and the ECU 121 are examples of on-board equipment.

The ECUs included in the vehicle 10 are configured to mutually perform communication by controller area network (CAN) communication. Each of the ECUs included in the vehicle 10 is connected so as to be mutually communicable by a plurality of CAN communication networks 180. The ECU 100 functions as a gateway for relaying communication among the plurality of CAN communication networks 180. The CAN communication network 180 is an example of a communication network for which a signal is expected to be input at a predetermined cycle. The ECU 100 has a functionality of detecting input of an illegal signal to the CAN communication network 180.

Figure 2:
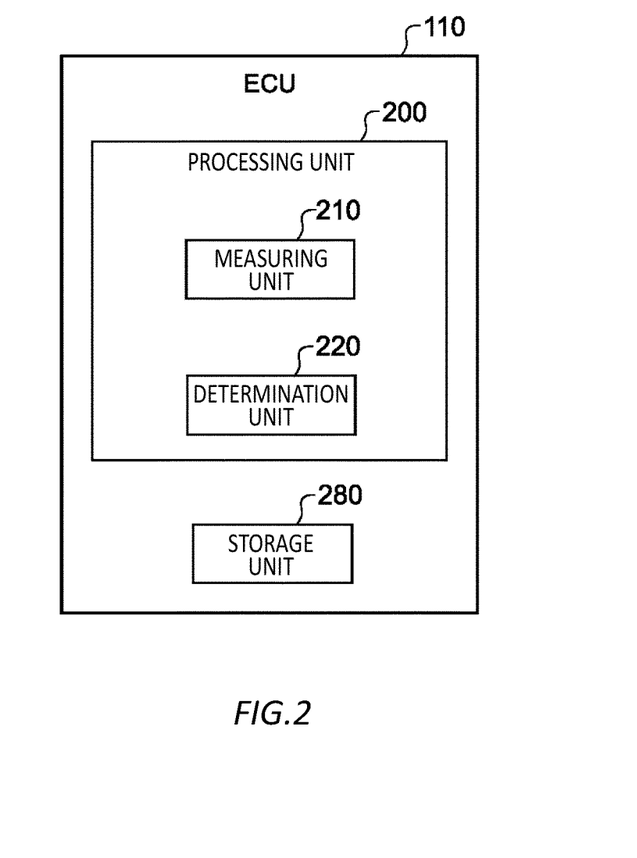
FIG. 2 is a block diagram schematically illustrating a functional configuration included in an ECU 100.

FIG. 2 is a block diagram schematically illustrating a functional configuration included in the ECU 100. The ECU 100 includes a processing unit 200 and a storage unit 280. The ECU 100 performs processing of determining whether there is a transmission of an illegal signal to the CAN communication network 180 by a third person impersonating as an ECU included in the vehicle 10, which is so-called an impersonation attack.

The processing unit 200 may be implemented by a processor such as a CPU configured to perform computation processing. The storage unit 280 may include a non-volatile storage medium such as a flash memory or a volatile storage medium such as a random-access memory. The ECU 100 may be configured to include a computer. The ECU 100 performs various controls by operations of the processing unit 200 according to a program stored in a non-volatile storage media.

The processing unit 200 includes a measuring unit 210 and a determination unit 220. The measuring unit 210 measures, in time series, a time interval among a plurality of continuous signals input to the CAN communication network 180. In the present embodiment, a predetermined cycle may be referred to as a "set cycle". If the time interval between a first signal and a second signal that should be transmitted at a set cycle is longer than the set cycle, and a signal interval between the second signal and a signal that is input immediately before is equal to or smaller than a predetermined interval, the determination unit 220 judges that a competition has occurred when transmitting the second signal and determines that the second signal is an arbitrated normal signal. Accordingly, a signal that is delayed due to a competition with another signal can be regarded as a normal signal. Therefore, when performing processing of regarding a signal, in which a time interval between signals is within a predetermined time range, as a normal signal, that time range can be narrowed. Accordingly, the possibility of misrecognizing an illegal signal as a normal signal can be reduced.

If the time interval between a first signal and a second signal that should be transmitted at a set cycle is longer than the set cycle, and a difference between a reception timing that is determined from an input timing and a signal length of a signal immediately before the second signal and an input timing of the second signal is a predetermined minimum time interval that should be spaced between continuous signals, the determination unit 220 may judge that the competition has occurred. The predetermined minimum time interval that should be spaced between continuous signals is the time of an Intermission (ITM).

If the time interval between the first signal and the second signal is longer than the set cycle, and a signal length between the second signal and the signal that is input immediately before is less than a predetermined length, the determination unit 220 may determine that the second signal is not a normal signal and may determine whether the second signal is an illegal signal based on information included in the second signal or/and other signals input to the CAN communication network 180. For example, the determination unit 220 may determine whether the second signal can be regarded as a signal that is delayed due to the competition, based on the signal length included in header information of the signal. Accordingly, whether the signal is an illegal signal can be determined more accurately. That is, if the timings are detected by using a rear end of each signal (a reception completion timing of a signal) as a standard, signal length information of the second signal itself included in a header of the second signal is used to judge whether the second signal is pushed to the outside of the range in relation to the first signal. To judge more accurately, it can be determined from header information of the first signal and the like, whether the second signal is a normal signal that is pushed to the outside of the range due to a relationship between the first signal and the second signal, or is an abnormal signal existing outside of the range due to other factors.

As another method of determining whether the competition has occurred, if the time interval between a first signal and a second signal that should be transmitted at a set cycle is longer than the set cycle, and the time interval between a signal immediately before the second signal and the second signal is equal to or greater than a first threshold and is equal to or smaller than a second threshold, the determination unit 220 may judge that the competition has occurred when transmitting the second signal and may determine that the second signal is an arbitrated normal signal. As an example, the second threshold may be a value that is determined from a sum of the predetermined minimum time interval (for example, the time of an ITM) that should be spaced between continuous signals, and the signal length. The first threshold may be a value that is determined from the signal length. In this manner, if a difference between a reception timing that is determined from an input timing and a signal length of the signal immediately before the second signal and an input timing of the second signal is the predetermined minimum time interval that should be spaced between continuous signals, the determination unit 220 may judge that the competition has occurred.

If the time interval between the first signal and the second signal is longer than the set cycle, and the time interval between the reception timing of the signal immediately before the second signal and the input timing of the second signal exceeds the second threshold, the determination unit 220 may determine that the second signal is not a normal signal, and may determine whether the second signal is an illegal signal based on information included in the second signal and other signals input to the CAN communication network 180. For example, the determination unit 220 may determine whether the second signal can be regarded as a signal that is delayed due to the competition, based on the signal length included in header information of the signal. Accordingly, whether the second signal is an illegal signal can be determined more accurately.

The measuring unit 210 may detect a time interval of timings at which input of each signal of a plurality of signals is started as a time interval among the plurality of signals. If input start timings of signals are assumed as a time interval among a plurality of signals, the determination unit 220 may judge whether the competition has occurred by taking into consideration the signal length of the signal immediately before the second signal.

The measuring unit 210 may detect a time interval of timings at which input of each signal of a plurality of signals is completed as a time interval among the plurality of signals. In this case, if the time interval between a first signal and a second signal that should be transmitted at a set cycle is longer than the set cycle, and the interval between a signal immediately before the second signal and the second signal is equal to or smaller than a predetermined interval, the determination unit 220 may judge that the competition has occurred when transmitting the second signal and may determine that the second signal is an arbitrated normal signal. As another method of determining whether the competition has occurred, if the time interval between a first signal and a second signal that should be transmitted at a set cycle is longer than the set cycle, and the time interval between a signal immediately before the second signal and the second signal is equal to or greater than a first threshold that is determined based on a signal length of the second signal and is equal to or smaller than a second threshold that is also determined based on the signal length of the second signal, the determination unit 220 may judge that the competition has occurred when transmitting the second signal and may determine that the second signal is an arbitrated normal signal. If input completion timings of signals are assumed as a time interval among a plurality of signals, the determination unit 220 may judge whether the competition has occurred by taking into consideration the signal length of the second signal. By adopting the embodiment of assuming input completion timings of signals as a time interval among a plurality of signals, there is no need to acquire the signal length from header information of the previous signal to determine whether the competition has occurred when transmitting the second signal, and the determination can be made by taking into consideration the signal length from header information of the second signal itself.

Figure 3:
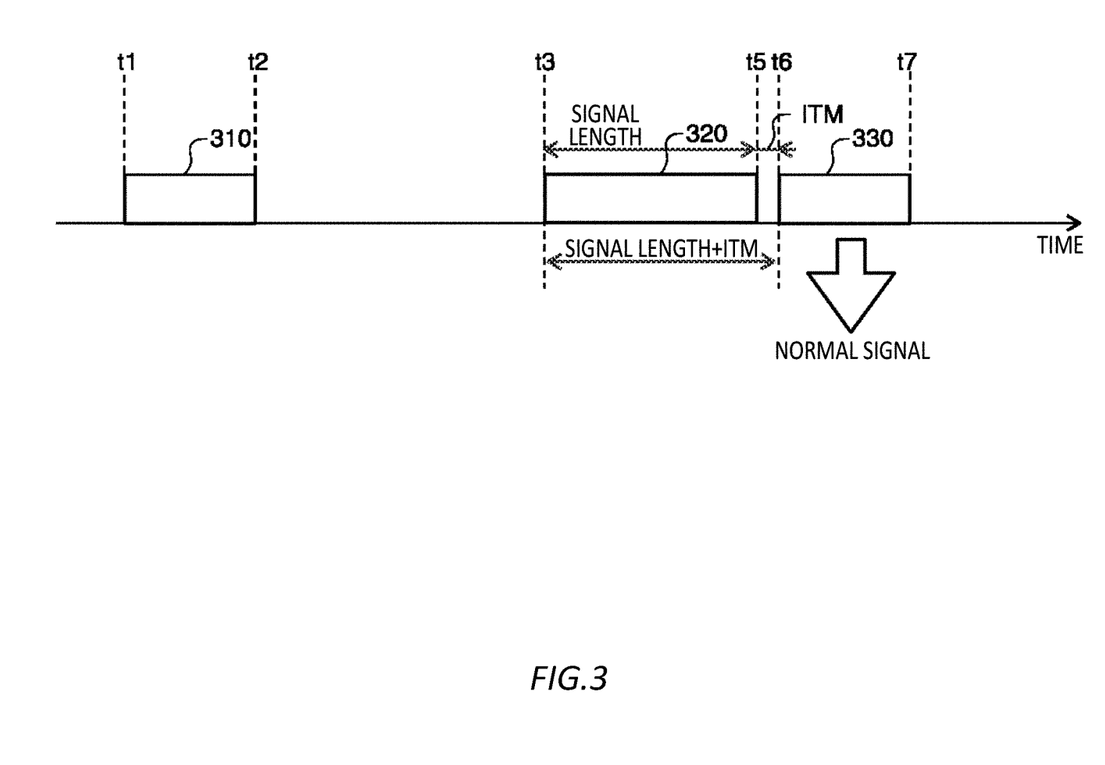
FIG. 3 schematically illustrates a state in which a signal 330 is delayed from a cyclic input timing due to a competition with another signal.

FIG. 3 schematically illustrates a state in which a signal 330 is delayed from a cyclic input timing due to the competition with another signal. In FIG. 3, a signal 310, a signal 320, and the signal 330 are signals that are continuously input to the CAN communication network 180. In the present embodiment, with an intention to show signals transmitted through the CAN communication network 180 in a manner that is easy to understand, the signals may not be illustrated at a constant time scale.

The signal 310 is a signal in which its input to the CAN communication network 180 is started from a time t1, and its input to the CAN communication network 180 is ended at time t2. The signal 320 is a signal in which its input to the CAN communication network 180 is started from a time t3, and its input to the CAN communication network 180 is ended at a time t5. The signal 330 is a signal in which its input to the CAN communication network 180 is started at a time t6, and its input to the CAN communication network 180 is ended at a time t7.

In FIG. 3, the signal 310 and the signal 330 are signals belonging to a group of signals that are input to the CAN communication network 180 at a predetermined cycle. The signal 310 and the signal 330 are assumed as signals including the same CAN ID. The signal 330 is a signal that is delayed due to the competition with the signal 320. In the present embodiment, an illegal signal detection processing performed by the ECU 110 is described by assuming that the CAN ID of the signal 320 is different from the CAN ID of the signal 310 and the signal 330. However, a similar processing can also be applied to a case where the CAN ID of the signal 320 is the same as the CAN ID of the signal 310 and the signal 330.

For example, as a result of starting input of the signal 330 to the CAN communication network 180 at the same time as the signal 320, due to a communication competition, input to the CAN communication network 180 is started after the time t5, which is after input of the signal 320 to the CAN communication network 180 is ended. In another example, the signal 330 is a signal in which its input should be started within a period that the signal 320 has been input to the CAN communication network 180, and its input to the CAN communication network 180 is started after the time t5, after waiting for the bus to become an idle state following the end of input of the signal 320 to the CAN communication network 180. When inputting the signal 330 to the CAN communication network 180, after input of a data frame of the signal 320 to the CAN communication network 180 is ended, the bus idle state is reached after the end of an Intermission (ITM) of 3 bits. Therefore, regarding the signal 330 competing with the signal 320, its input to the CAN communication network 180 may be started from the time t6 in which the time that the ITM ends has passed from the time t5. The time interval corresponding to the ITM is an example of the predetermined minimum time interval that should be spaced between continuous signals.

Accordingly, if the time interval between the time t6 and the time t3 matches the total value of a signal length and an ITM of the signal 320, the determination unit 220 may judge that the signal 330 is delayed due to the competition with the signal 320. Therefore, the determination unit 220 determines that the signal 330 is a normal signal.

In this manner, if the interval between the time t5 and the time t6 that is calculated from the timing at which input of the signal 320 to the CAN communication network 180 is started and the signal length of the signal 320 matches the ITM, the determination unit 220 may determine that the signal 330 is a normal signal.

In this regard, if the signal length of the signal 320 is longer than a predetermined length, the determination unit 220 may judge that the signal 330 is delayed due to the competition with the signal 320, and may determine that the signal 330 is a normal signal. In this manner, the determination unit 220 may determine that the signal 320 and the signal 330 are competing, from the point that the signal length of the signal 320 immediately before the signal 330 becomes longer. Furthermore, if the time interval between the time t6 and the time t3 is equal to or greater than the total value of the signal length and the ITM, and is equal to or smaller than the total value of the signal length, the ITM, and a predetermined margin, the determination unit 220 may judge that the signal 330 is delayed due to the competition with the signal 320. Furthermore, if the time interval between the time t6 and the time t3 is equal to or greater than the signal length, and is equal to or smaller than the total value of the signal length, the ITM, and the predetermined margin, the determination unit 220 may judge that the signal 330 is delayed due to the competition with the signal 320.

Figure 4:
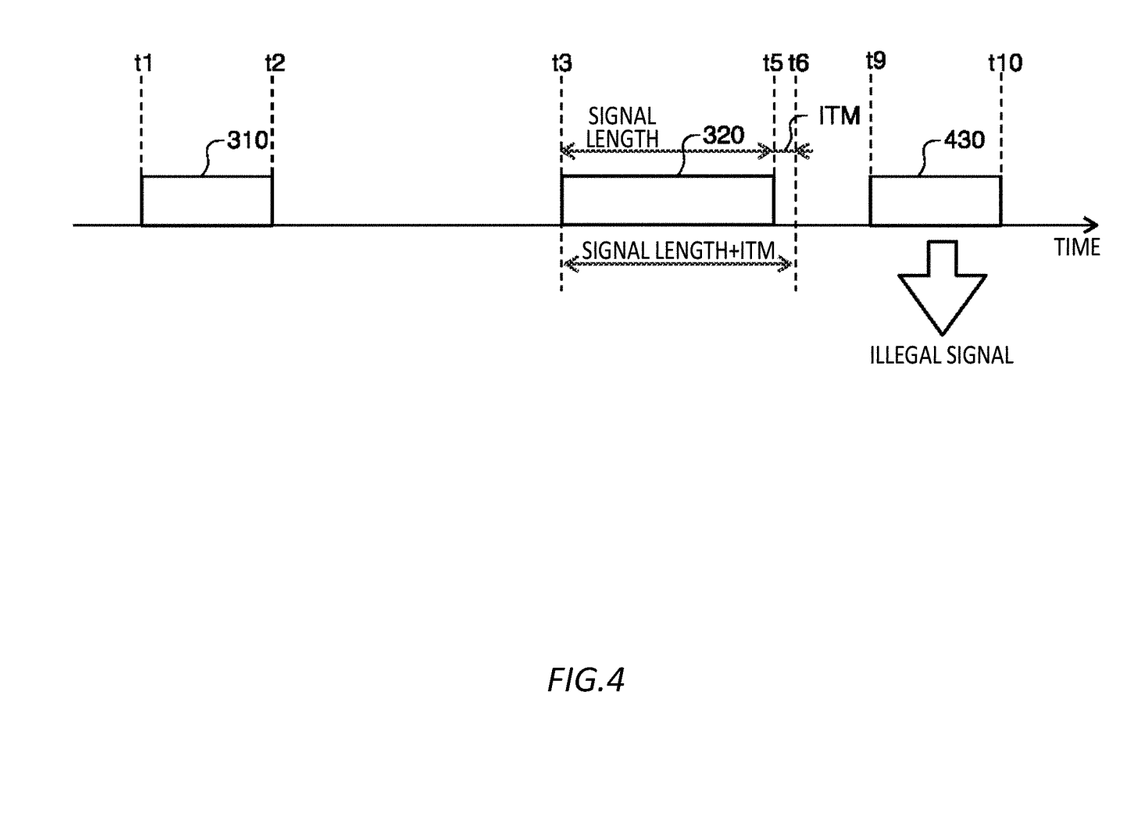
FIG. 4 schematically illustrates a state in which a signal 430 is delayed from a cyclic input timing regardless of a competition with another signal.

FIG. 4 schematically illustrates a state in which a signal 430 is delayed from a cyclic input timing regardless of the competition with another signal. The signal 310 and the signal 430 are assumed as signals including the same CAN ID. Unlike FIG. 3, the signal 430 is a signal that is delayed without the competition with the signal 320.

As shown in FIG. 4, input of the signal 430 to the CAN communication network 180 is started from a time t9 that is later than the time t6. Since the time interval between the time t9 and the time t3 is longer than the total value of the signal length and the ITM of the signal 320, the determination unit 220 may judge that the signal 430 is delayed regardless of the competition with the signal 320. Therefore, the determination unit 220 determines that the signal 430 is an illegal signal.

That is, if the interval between the time t5 and the time t9 that is calculated from the timing at which input of the signal 320 to the CAN communication network 180 is started and the signal length of the signal 320 is longer than the ITM, the determination unit 220 may determine that the signal 330 is a normal signal.

The examples in FIG. 3 and FIG. 4 mainly describe the case in which the measuring unit 210 measures the time interval between times at which input of signals to the CAN communication network 180 is started as the time interval between continuous signals. However, the measuring unit 210 may measure the time interval between times at which input of signals to the CAN communication network 180 is ended as the time interval between continuous signals. For example, in the example shown in FIG. 3, the determination unit 220 may judge that the signal 330 is delayed due to the competition with the signal 320 from the point that the time interval between the time t7 and the time t5 matches the total value of a signal length and an ITM of the signal 330. Accordingly, the determination unit 220 may determine that the signal 330 is a normal signal. In the example shown in FIG. 4, the determination unit 220 may judge that the signal 430 is delayed regardless of the competition with the signal 320 from the point that the time interval between a time t10 and the time t5 is longer than the total value of the signal length and the ITM of the signal 320. Therefore, the determination unit 220 may determine that the signal 430 is an illegal signal.

Figure 5:
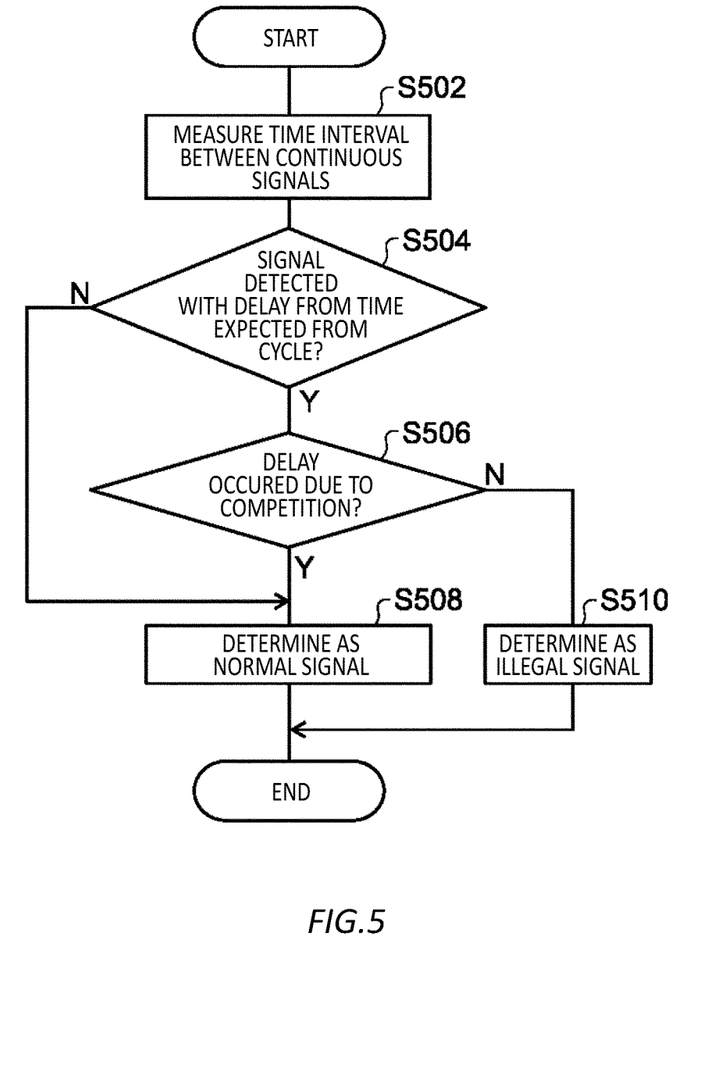
FIG. 5 is a flowchart relating to an illegal signal detection method performed by an ECU 110.

FIG. 5 is a flowchart relating to an illegal signal detection method performed by the ECU 110. In FIG. 5, the processing of the flowchart in FIG. 5 may be performed every time a signal is detected on the CAN communication network 180.

Once a signal is detected, in S502, the measuring unit 210 measures the time interval between continuous signals. As described above, the time interval may be calculated from times at which continuous signals are input, and may be calculated from times at which input of the continuous signals is ended.

In S504, the determination unit 220 determines, based on the time interval measured by the measuring unit 210, whether a signal that should be cyclically input to the CAN communication network 180 is delayed from an input time that is predicted from the cycle. For example, in FIG. 3, whether the time interval between the signal 310 and the signal 330 is longer than the time that is calculated based on the cycle may be determined.

In S504, if the signal that should be cyclically input to the CAN communication network 180 is determined as not being delayed from the input time predicted from the cycle, the processing moves to S508. On the other hand, in S504, if the signal that should be cyclically input to the CAN communication network 180 is determined as being delayed from the input time predicted from the cycle, the processing moves to S506.

In S506, the determination unit 220 determines whether the signal that should be cyclically input to the CAN communication network 180 is delayed due to the competition. For example, as described in relation to FIG. 3 and FIG. 4, whether the signal that should be cyclically input is delayed due to the competition is determined based on the time interval between continuous signals, the signal length, and the time corresponding to output of the ITM. If the signal that should be cyclically input is determined as being delayed due to the competition, in S508, the determination unit 220 determines that the delayed signal is a normal signal. On the other hand, if the signal that should be cyclically input is determined as not being delayed due to the competition, in S510, the determination unit 220 determines that the delayed signal is an illegal signal. In this regard, the determination unit 220 may confirm, based on information included in a header or a data field of each of a signal that is the determination target and/or a signal that is input to the CAN communication network 180 before the signal that is the determination target, whether the signal is delayed due to the competition with another signal at the time of its transmission.

As described above, according to the system 20, even if the signal that should be cyclically input to the CAN communication network 180 is input to the CAN communication network 180 with a delay, the signal can be determined to be a normal signal if it is judged that the signal is delayed due to communication arbitration or bus idle waiting. Accordingly, the possibility of mistakenly determining that a signal that is delayed simply due to communication arbitration or bus idle waiting is an illegal signal can be reduced. In addition, a signal that is delayed regardless of communication arbitration or bus idle waiting can be determined as being an illegal signal.

In the embodiment described above, the embodiment in which the ECU 110 performs processing of detecting an illegal signal is described. However, embodiments in which other ECUs including the ECU 100 perform processing of detecting an illegal signal can also be applied.

Figure 6:
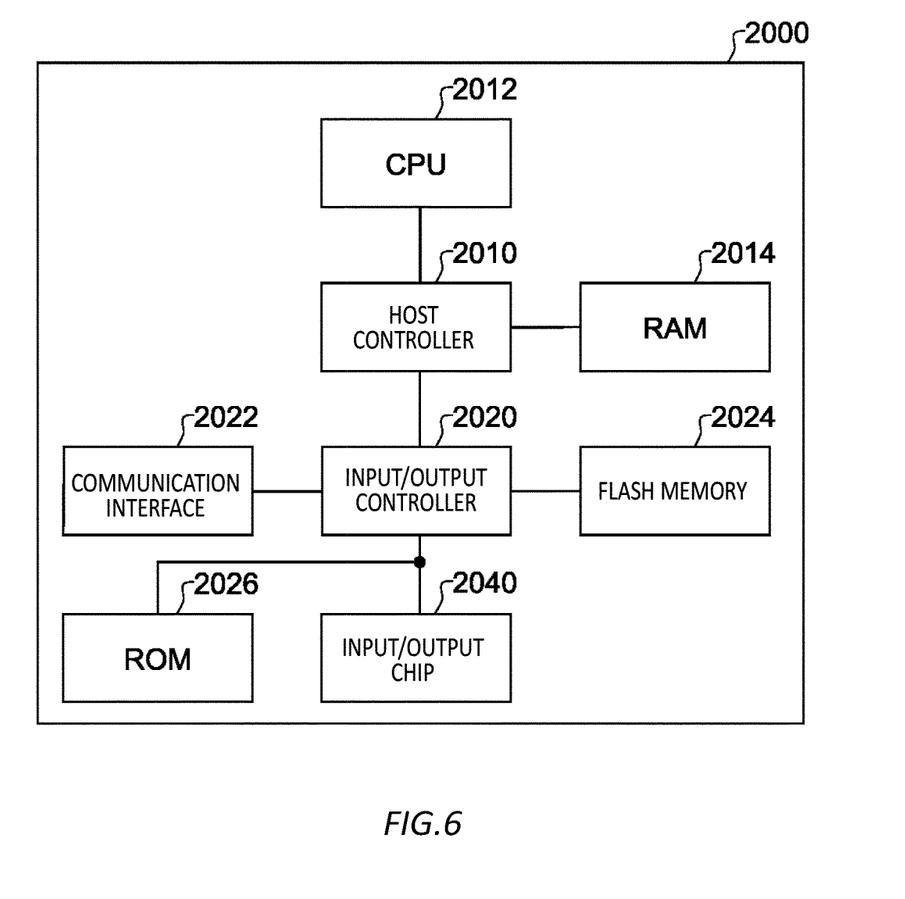
FIG. 6 illustrates an example of a computer 2000.

FIG. 6 shows an example of a computer 2000 in which a plurality of embodiments of the present invention may be entirely or partially embodied. A program that is installed in the computer 2000 can cause the computer 2000 to function as a system such as the system 20 according to the embodiment, each unit of the system, or an apparatus such as the ECU 110 or each unit of the apparatus, execute an operation associated with the system, each unit of the system, the apparatus, or each unit of the apparatus, and/or execute a process according to the embodiment or a step of the process. Such a program may be executed by a CPU 2012 in order to cause the computer 2000 to execute a specific operation associated with some or all of the blocks in the processing procedure and the block diagram described in the present specification.

The computer 2000 according to the present embodiment includes the CPU 2012 and a RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores therein the program and data used by the CPU 2012 in the computer 2000. The ROM 2026 stores therein a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

A program is provided via a network or computer-readable storage media such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in the program is read by the computer 2000, thereby resulting in cooperation between the program and above-described various types of hardware resources. An apparatus or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing based on the processing written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes reception data received from the network into a reception buffer processing area or the like provided on the recording medium.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012, then, writes back the processed data into the recording medium.

Various types of programs and various types of information such as data, tables, and databases may be stored in the recording medium, and they may be performed information processing. The CPU 2012 may perform, on the data read from the RAM 2014, various kinds of processing including various kinds of operations, information processing, conditional judgments, conditional branching, unconditional branching, information searching/replacing and the like described in the present specification and specified by an instruction sequence of the program, and writes back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

A program that is installed on the computer 2000 and causes the computer 2000 to function as the ECU 110, may work on the CPU 2012 or the like to cause the computer 2000 to function as each unit of the ECU 110. The information processing written in these programs is read into the computer 2000, thereby functioning as each unit of the ECU 110 as specific means in which software and the various hardware resources described above cooperate with one another. Then, these specific means implement operations or processing of information according to the intended use of the computer 2000 in the present embodiment, so that the ECU 110 that is unique is constructed according to the intended use.

A variety of embodiments have been described with reference to the block diagram and the like. In the block diagram, each block may represent (1) a step of a process in which an operation is performed, or (2) each unit of the apparatus having a role of performing the operation. Certain steps and units may be implemented by a dedicated circuit, a programmable circuit supplied with computer-readable instructions stored on computer-readable storage media, and/or processors supplied with computer-readable instructions stored on computer-readable storage media. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of the computer-readable storage medium may include an electronic storage medium, a magnetic storage medium, an optical storage medium, an electromagnetic storage medium, a semiconductor storage medium, and the like. A more specific example of the computer-readable storage medium may include a floppy (registered trademark) disk, a diskette, a hard disk, a random-access memory (RAM), a read-only memory (ROM), an erasable programmable read-only memory (EPROM or Flash memory), an electrically erasable programmable read-only memory (EEPROM), a static random-access memory (SRAM), a compact disc read-only memory (CD-ROM), a digital versatile disk (DVD), a BLU-RAY (registered trademark) disc, a memory stick, an integrated circuit card, etc.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a general-purpose computer, a special-purpose computer, or a processor or a programmable circuit of other programmable data processing apparatus, locally or via a local area network (LAN), a wide area network (WAN) such as the internet, and computer-readable instructions may be executed in order to result in a means for executing operations specified by the described processing procedure or the block diagram. Examples of the processor include a computer processor, a processing unit, a microprocessor, a digital signal processor, a controller, a microcontroller, and the like.

While the present invention has been described above by using the embodiments, the technical scope of the present invention is not limited to the scope of the claims according to the above-described embodiments. It is apparent to persons skilled in the art that various alterations or improvements can be added to the above-described embodiments. It is also apparent from the description of the claims that the embodiment to which such alterations or improvements are made can be included in the technical scope of the present invention.

The operations, procedures, steps, and stages of each processing performed by an apparatus, system, program, and method shown in the claims, specification, or drawings can be performed in any order as long as the order is not indicated by "prior to," "before," or the like and as long as the output from previous processing is not used in later processing. Even if the process flow is described using phrases such as "first" or "next" in the claims, specification, or drawings, it does not necessarily mean that the process must be performed in this order.

EXPLANATION OF REFERENCES 10 vehicle;
20 system;
100: ECU;
110: ECU;
111: ECU;
120: ECU;
121: ECU;
180: CAN communication network;
200: processing unit;
210: measuring unit;
220: determination unit;
280: storage unit;
2000: computer;
2010: host controller;
2012: CPU;
2014: RAM;
2020: input/output controller;
2022: communication interface;
2024: flash memory;
2026: ROM;
2040: input/output chip.

What is claimed is:

1. An illegal signal detection apparatus for detecting input of an illegal signal to a communication network for which a signal is expected to be input at a predetermined cycle, comprising:

a measuring unit for measuring, in time series, a time interval among a plurality of continuous signals input to the communication network; and a determination unit for judging, if a time interval between a first signal and a second signal that should be transmitted at the cycle is longer than the cycle, and a signal interval between the second signal and a third signal that is input immediately before is equal to or smaller than a predetermined interval, (i) that a competition has occurred when transmitting the second signal to determine that the second signal is an arbitrated normal signal, if a difference between a reception timing that is determined from an input timing and a signal length of the third signal and an input timing of the second signal is a predetermined minimum time interval that should be spaced between continuous signals, and (ii) that a competition has occurred when transmitting the second signal to determine that the second signal is an illegal signal, if a difference between a reception timing that is determined from an input timing and a signal length of the third signal and an input timing of the second signal is longer than a total value of the predetermined minimum time interval and a predetermined margin.

2. An illegal signal detection apparatus for detecting input of an illegal signal to a communication network for which a signal is expected to be input at a predetermined cycle, comprising:

a measuring unit for measuring, in time series, a time interval among a plurality of continuous signals input to the communication network; and a determination unit for judging, if a time interval between a first signal and a second signal that should be transmitted at the cycle is longer than the cycle, and a time interval between a third signal immediately before the second signal and the second signal is equal to or greater than a first threshold and is equal to or smaller than a second threshold, (i) that a competition has occurred when transmitting the second signal to determine that the second signal is an arbitrated normal signal, if a difference between a reception timing that is determined from an input timing and a signal length of the third signal and an input timing of the second signal is a predetermined minimum time interval that should be spaced between continuous signals and (ii) that a competition has occurred when transmitting the second signal to determine that the second signal is an illegal signal, if a difference between a reception timing that is determined from an input timing and a signal length of the third signal and an input timing of the second signal is longer than a total value of the predetermined minimum time interval and a predetermined margin.

3. The illegal signal detection apparatus according to claim 1, wherein the determination unit is configured to determine, if a time interval between the first signal and the second signal is longer than the cycle, and a signal length between the second signal and the third signal is less than a predetermined length, that the second signal is not a normal signal and determine whether the second signal is an illegal signal based on information included in the second signal or/and other signals input to the communication network.

4. The illegal signal detection apparatus according to claim 2, wherein the determination unit is configured to determine, if a time interval between the first signal and the second signal is longer than the cycle, and a time interval between a reception timing of a signal immediately before the second signal and an input timing of the second signal exceeds the second threshold, that the second signal is not a normal signal and determine whether the second signal is an illegal signal based on information included in the second signal or/and other signals input to the communication network.

5. The illegal signal detection apparatus according to claim 1, wherein the measuring unit is configured to detect a time interval of timings at which input of each signal of the plurality of signals is completed as a time interval among the plurality of signals.

6. The illegal signal detection apparatus according to claim 2, wherein the measuring unit is configured to detect a time interval of timings at which input of each signal of the plurality of signals is completed as a time interval among the plurality of signals.

7. The illegal signal detection apparatus according to claim 1, wherein the measuring unit is configured to detect a time interval of timings at which input of each signal of the plurality of signals is started as a time interval among the plurality of signals.

8. The illegal signal detection apparatus according to claim 2, wherein the measuring unit is configured to detect a time interval of timings at which input of each signal of the plurality of signals is started as a time interval among the plurality of signals.

9. The illegal signal detection apparatus according to claim 1, wherein the communication network is a controller area network (CAN) communication network.

10. The illegal signal detection apparatus according to claim 9, wherein the first signal and the second signal are signals including a same CAN ID (Identifier).

11. The illegal signal detection apparatus according to claim 10, wherein the signal that is input immediately before is a signal including a CAN ID that is different from the CAN ID included in the first signal and the second signal.

12. The illegal signal detection apparatus according to claim 1, wherein the communication network is a controller area network (CAN) communication network, and the minimum time interval is an intermission period.

13. The illegal signal detection apparatus according to claim 2, wherein the communication network is a controller area network (CAN) communication network.

14. The illegal signal detection apparatus according to claim 13, wherein the first signal and the second signal are signals including a same CAN ID (Identifier).

15. The illegal signal detection apparatus according to claim 14, wherein the signal that is input immediately before is a signal including a CAN ID that is different from the CAN ID included in the first signal and the second signal.

16. The illegal signal detection apparatus according to claim 2, wherein the communication network is a controller area network (CAN) communication network, and the minimum time interval is an intermission period.

17. An illegal signal detection apparatus for detecting input of an illegal signal to a communication network for which a signal is expected to be input at a predetermined cycle, comprising:

a measuring unit for measuring a time interval of timings at which input of each signal of a plurality of signals input to the communication network is completed; and a determination unit for judging, if the time interval between a first signal and a second signal that should be transmitted at the cycle is longer than the cycle, and an interval between a third signal immediately before the second signal and the second signal is equal to or smaller than a predetermined interval, (i) that a competition has occurred when transmitting the second signal to determine that the second signal is an arbitrated normal signal, if a difference between a reception timing that is determined from an input timing and a signal length of the third signal and an input timing of the second signal is a predetermined minimum time interval that should be spaced between continuous signals, and (ii) that a competition has occurred when transmitting the second signal to determine that the second signal is an illegal signal, if a difference between a reception timing that is determined from an input timing and a signal length of the third signal and an input timing of the second signal is longer than a total value of the predetermined minimum time interval and a predetermined margin.

18. The illegal signal detection apparatus according to claim 1, wherein the illegal signal detection apparatus is mounted on a vehicle.

\* \* \* \* \*